United States Patent
Balog et al.

[11] Patent Number: 5,864,594
[45] Date of Patent: Jan. 26, 1999

[54] APPARATUS AND METHOD FOR REPLACING INTERNAL COMPONENTS IN A NUCLEAR REACTOR

[75] Inventors: Leonard J. Balog; Bruce W. Bevilacqua, both of Export, Pa.; Ronald J. Hopkins, Pensacola, Fla.; Arthur W. Kramer, Jeannette; Donald G. Sherwood, Monroeville, both of Pa.

[73] Assignee: Westinghouse Electric Corporation, Pittsburgh, Pa.

[21] Appl. No.: 692,840

[22] Filed: Aug. 2, 1996

Related U.S. Application Data

[60] Provisional application No. 60/001,804, Sep. 2, 1995.
[51] Int. Cl.[6] .......................... G21C 19/00; G21C 13/00
[52] U.S. Cl. .......................... 376/260; 376/302; 376/461
[58] Field of Search .......................... 376/260, 302, 376/262, 263, 364, 461, 463; 29/402.03, 402.08

[56] References Cited

U.S. PATENT DOCUMENTS

| | | |
|---|---|---|
| 4,707,325 | 11/1987 | Hopkins . |
| 4,756,877 | 7/1988 | Veronesi et al. .......................... 376/362 |
| 5,149,490 | 9/1992 | Brown et al. . |
| 5,490,190 | 2/1996 | Hopkins et al. . |
| 5,550,883 | 8/1996 | Bougis .......................... 376/302 |

FOREIGN PATENT DOCUMENTS

| | | |
|---|---|---|
| 63 225 | 10/1982 | European Pat. Off. . |
| 2 368 118 | 5/1978 | France . |
| 2 585 870 | 2/1987 | France . |

*Primary Examiner*—Charles Jordan
*Assistant Examiner*—M. J. Lattig

[57] ABSTRACT

An apparatus and method are provided for replacing the existing lower internal components in a nuclear reactor vessel with new components. The alignment of the new lower internals to the pressure vessel and the existing upper internals is achieved by customizing the new lower internals on-site based on alignment measurements obtained by gages installed on the new core barrel and the existing upper core plate. The gages allow the custom machining of radial support keys on the lower portion of the new core barrel and the custom drilling of upper core plate alignment pin holes in the new core barrel.

20 Claims, 11 Drawing Sheets

APPARATUS AND METHOD FOR REPLACING INTERNAL COMPONENTS IN A NUCLEAR REACTOR

CROSS-REFERENCE TO RELATED APPLICATIONS

The present application is based on Provisional Application Ser. No. 60/001,804 filed Sep. 2, 1995, the priority of which is claimed in the present application.

BACKGROUND OF THE INVENTION

The current invention concerns nuclear reactors. More specifically, the current invention concerns an apparatus and method for replacing the internal components, such as the lower internals, of a nuclear reactor.

In a nuclear reactor, the internal components typically consist of upper and lower internals. The upper internals include a control rod guide tube assembly, support columns, conduits for instrumentation which enters the reactor vessel through the closure head, and a fuel assembly alignment structure, referred to as an upper core plate. The lower internals include a core support structure, referred to as a core barrel, and conduits for instrumentation which enters the reactor vessel at its bottom. After many years of service, it is often desirable to replace a portion of the reactor internals, especially the lower internals, which are in close proximity to the core. Such replacement not only has the potential to add years to the reactor life by substituting new components for those which have been exposed to the vibration, radiation and thermal stress associated with operation of the reactor, it also allows the introduction of upgraded equipment developed after the initial assembly of the reactor in the factory. For instance, better shielding designs can be incorporated in the core baffle region so that more fast neutrons are reflected back into the core resulting in both fuel efficiencies and an extended reactor vessel life. Despite the advantages of replacing the lower internals, in the past, such replacement during an outage for re-fueling was thought impractical. This was so because the new lower internals must be precisely aligned with respect to the existing upper internals and pressure vessel in order to ensure proper operation of the reactor. According to the prior art approach, such precise alignment would have required extensive on-site work to customize the new lower internals to the existing upper internals and the pressure vessel. This on-site work resulted in (i) an unacceptable increase in reactor down-time over that associated with a re-fueling operation and (ii) excessive exposure of maintenance personnel to radiation.

Accordingly, it would be desirable to provide an apparatus and method which enabled replacement of the lower internal components in a nuclear reactor in a relatively short period of time and with only minimum exposure of personnel to radiation and yet which resulted in accurate alignment of the new components to the existing ones.

SUMMARY OF THE INVENTION

It is the object of the current invention to provide an apparatus and method for replacing the lower internals in a nuclear reactor.

It is a further object of the current invention that the new lower internals be properly aligned to the existing pressure vessel and upper internals without excessive increase in reactor down-time or exposure of personnel to radiation.

These and other objects are accomplished by the steps of remotely determining the alignment of the replacement lower internals assembly with the pressure vessel at a first aligning means and then forming the first aligning means so as to obtain a predetermined alignment of the replacement internals assembly with the pressure vessel based upon the remote alignment determination. The first step of remotely determining the alignment of the replacement lower internals assembly may be performed with an actual lower internals assembly or, in an equivalent practice, with a simulated lower internals assembly.

In a preferred instance, these and other objects are accomplished in a nuclear reactor having a (i) pressure vessel, (ii) a core containing fuel assemblies, (iii) control rod drive shafts, (iv) an upper internals assembly adapted to support said control rod drive shafts, and (v) a lower internals assembly adapted to be enclosed by the pressure vessel and support the core. The upper internals assembly comprises an upper core plate in which two alignment pins for each fuel assembly are disposed to align the fuel assemblies to the upper internals. The lower internals assembly is comprised of a core barrel incorporating two alignment devices. The first device comprises support keys, each adapted to engage a keyway formed in the pressure vessel, for aligning the lower internals to the vessel. Proper alignment of the lower internals to the vessel is obtained by setting the clearance between radial support keys and the sides of the keyway to a predetermined amount once the lower internals are correctly positioned in the vessel. The second device comprises alignment pins, each adapted to engage a notch in the upper core plate, for aligning the lower internals to the upper internals. Proper alignment of the lower internals to the upper internals is obtained by setting the clearance between the alignment pins and the sides of notches in the upper core plate to a predetermined amount, once the upper core plate is correctly positioned over the lower core plate and with respect to the case baffle cavity.

Replacement of the existing lower internals with correctly aligned new lower internals is accomplished by customizing the location and size of the radial support keys and alignment pins in the new lower internals to suit the keyways in the existing pressure vessel and the notches in the existing upper core plate, respectively. The radial support key is customized by employing remote means to determine the location of the centerline of the key on the new lower internals which is required to obtain the predetermined alignment. This is accomplished by affixing a first gage, having a plunger capable of retracting and extending, to the new lower internals at the support key locations and installing the new lower internals into the vessel. The plunger tip is then extended until it contacts the sides of the keyway and the distance the plunger has traveled is used to determine the required distance from the centerline of the key to the keyway. This measurement, taken by mechanical or electronic means, may be taken once the new lower internals are withdrawn. The keys for the new lower internals are then custom machined to achieve this alignment.

The new lower internals are aligned to the existing upper internals by locating the alignment pin holes in the sides of the core barrel so that the desired clearance between each pin and the sides of the notch in the upper core plate is obtained. This is accomplished by installing a second gage, having a plunger capable of retracting and extending, onto the underside of the existing upper core plate, locating the second gage using two of the fuel assembly alignment pins near the notch. The plungers are expanded to fill the notch and locked in place establishing a centerline of the opening which will later be projected to become the centerline of the upper core plate alignment pin when it is affixed to the new lower internals. Another feature of this gage is additional pins, or a fence-like structure, protruding below the gage plate, (several inches), precisely located with respect to the fuel assembly alignment pins, and representing the perimeter or boundary of the case barrel cavity in the near vicinity of the notch in the upper core plate. A gage, as just described, will be positioned and mounted at each of the four notch locations on the upper core plate and identified as the 0°, 90°, 180°, and 270° positions. When the centers of the notches are produced on the gage plates by a drilled hole, scribe-line, or other suitable method, the four gages will be shipped to the facility where the new reactor internals are being fabricated. The gages are mounted to a dummy upper core plate over precisely located dummy fuel assembly alignment pins positioned as those on the old upper core plate. The dummy core plate, gages affixed, is then positioned at the proper elevation in the new lower core barrel, supported on top of the core baffle structure. The dummy core plate will then be shifted around until the optimum position with respect to baffle cavity opening and the lower core plate is achieved. Features on the gages (holes, notches, or scribe lines), marking the centers of the notches on the real upper core plate will then be transferred to the lower core barrel, thus locating the exact position for drilling/boring the holes for the upper core plate alignment pins.

To establish the axial centerline of the upper core plate alignment pins in the new core barrel, it is best achieved by first boring a hole through the barrel at the theoretically correct centerline position, (this hold should be undersize in comparison to the final hole size in which the alignment pin will be fitted). Working radially though this hole, the centerline of the dummy core plate alignment pin notch is indicated. The centerline of the undersize hole is then translated to coincide, and the final bore size is then machined on this newly established center. This operation is repeated at each of the four upper case plate alignment pin locations.

DESCRIPTION OF THE PREFERRED EMBODIMENT

Figure 1:
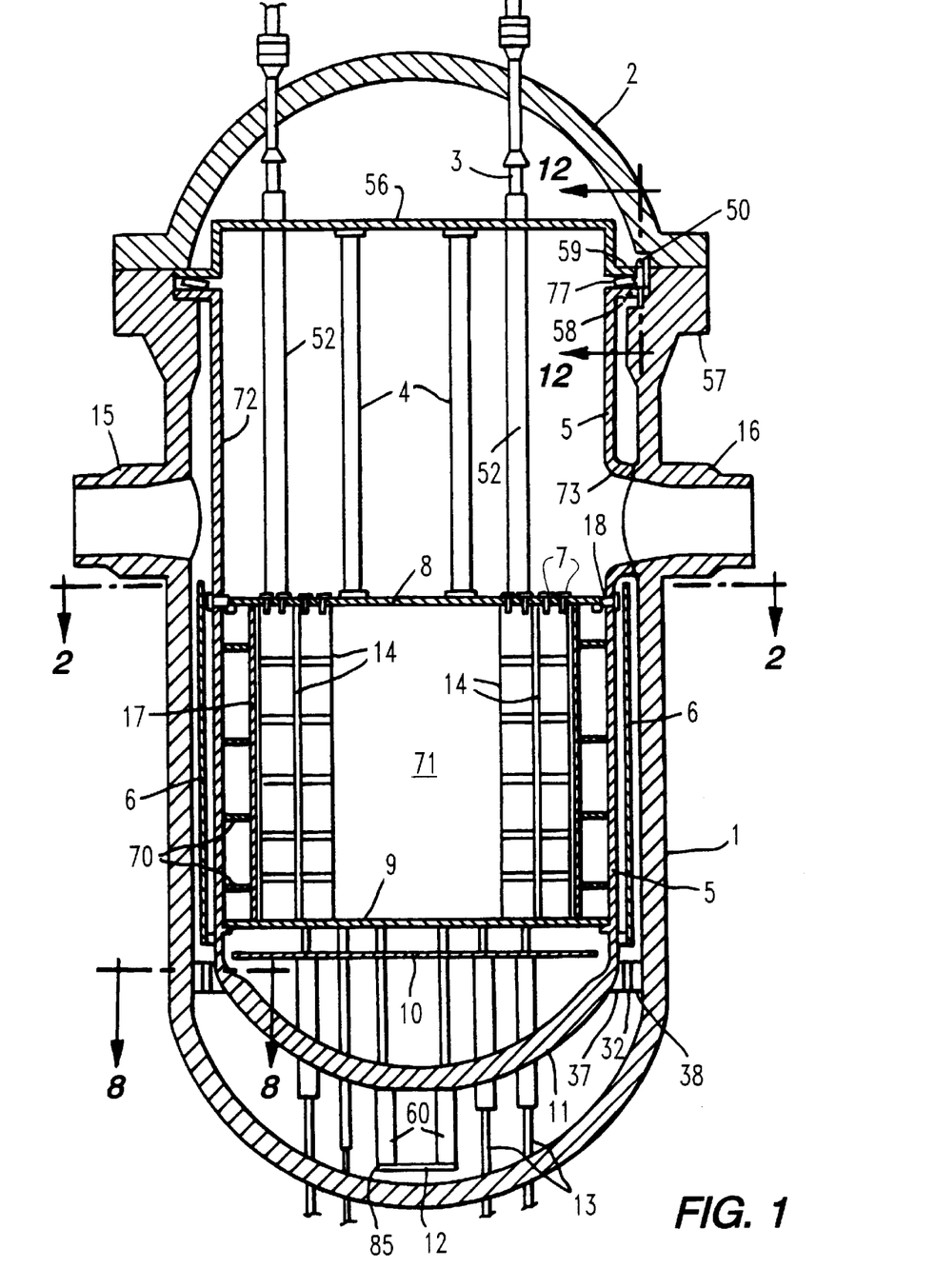
FIG. 1 is a vertical cross-section through a nuclear reactor.

There is shown in FIG. 1 a nuclear reactor, such as might be used in a nuclear power plant. The reactor is comprised of an approximately cylindrical pressure vessel 1 sealed at its top by an approximately hemispherical closure head 2. A reactor core 71 is disposed within the pressure vessel 1. The core 71 is comprised of an array of rectangular fuel assemblies 14 (although only four fuel assemblies 14 have been shown in FIG. 1 for simplicity, the number of fuel assemblies is actually much greater, as suggested by the array shown in FIG. 2). A core barrel 5 is also disposed within the vessel 1 and supports and encloses the core 71. The core barrel 5 is comprised of a cylindrical portion 72 having an approximately hemispherical bottom 11, a thermal shield 6 surrounding the cylinder 72 in the vicinity of the core 71, a lower core plate 9 on which the fuel assemblies 14 rest, a diffuser plate 10, and a baffle 17 surrounding the fuel assemblies 14 and affixed to the cylinder 72 via formers 70. Note that the reactor shown in FIG. 1 is typical of those on which the current invention may be practiced. However, it should be clear that the current invention is equally applicable to reactors having somewhat different configurations—for example, in some more recent vintage reactors the bottom 11 is a flat forging and the cylindrical thermal shield 6 has been replaced with a series of pads bolted directly to the core barrel in high neutron leakage locations, and baffles 17 and formers 70 could be replaced by a more solid core reflector.

As shown in FIG. 1, a plurality of instrumentation thimble guides 13 penetrate the bottom portion of the vessel 1 and extend through the bottom 11 of the core barrel 5 into the core 71. Also, an energy absorber 85, comprised of a plate 12 affixed to support columns 60, is affixed to the bottom 11 of the core barrel 5. The purpose of the energy absorber is to absorb a portion of the impact load should the core barrel 5 drop onto the bottom of the vessel 1 in the event of a failure of the core barrel upper flange.

Figure 2:
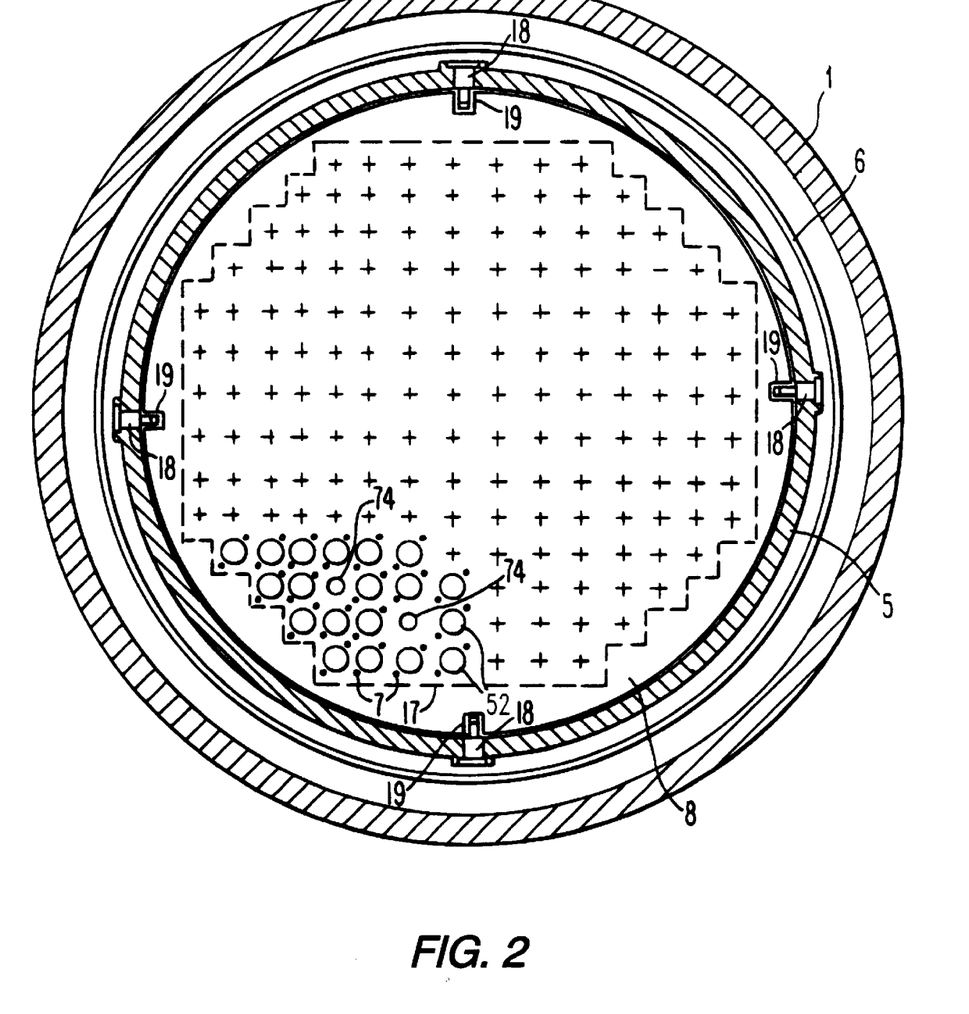
FIG. 2 is a cross-section taken through line II—II shown in FIG. 1.

The components within the vessel 1 discussed above are typically characterized as the "lower internals" assembly. The "upper internals" assembly is comprised of an upper core plate 8, a control rod support plate 56, support columns 4 (only two of which are shown in FIG. 1 for simplicity), and control rod guide tubes 52 for each control rod drive shaft 3 (although only two control rod drive shafts 3 are shown in FIG. 1 for simplicity, the number of control rods is actually much greater, as shown in FIG. 2), and instrumentation thimble guides (not shown) which extend between plates 8 and 56.

During operation, coolant enters inlet nozzles 15, one of which is shown in FIG. 1, dispersed about the circumference of the vessel 1 and flows downward through the annular cavity between the core barrel 5 and the vessel 1. The coolant then enters the core barrel 5 through holes (not shown) in its bottom 11 and flows upward through the core 71, absorbing heat therefrom. The coolant then flows out of the core through holes 74, two of which are shown in FIG. 2, in the upper core plate 8. From the core plate 8, the coolant discharges out of the core barrel 5 through discharge nozzles 73, one of which is Figure shown in FIG. 1, dispersed about the circumference of the core barrel and thence out of the reactor through discharge nozzles 16 dispersed about circumference of the vessel 1 and aligned with the core barrel discharge nozzles 73.

Figure 12:
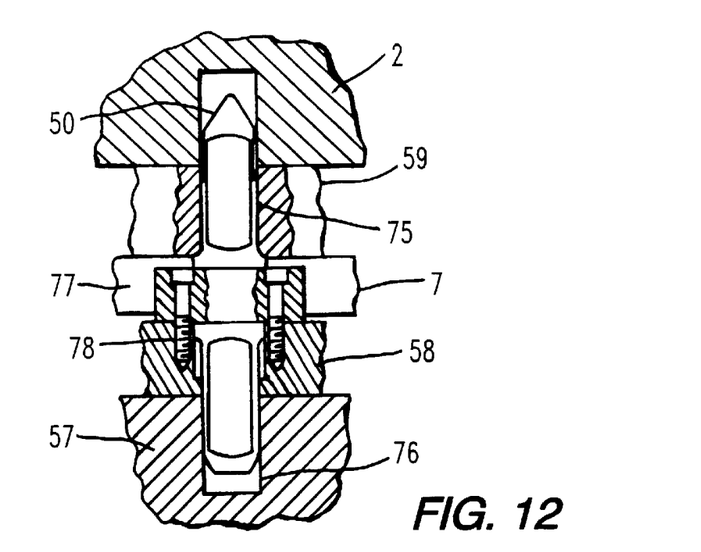
FIG. 12 is a cross-section taken through line XII—XII shown in FIG. 1.

In order for the reactor to function properly, a precise predetermined alignment must be maintained among the vessel 1, the upper internals, and the lower internals. Alignment in the vertical direction—that is, along the longitudinal axis of the reactor—is obtained at the vessel flange 57. As shown in FIGS. 1 and 12, a flange 58 formed at the top of the core barrel 5 rests on a support surface formed on the vessel flange 57, thereby vertically aligning the core barrel to the vessel. The upper internals are vertically aligned to the lower internals and the vessel 1 by a flange 59 formed in the control rod support plate 56. As shown in FIGS. 1 and 12, flange 59 rests on a hold down spring 77 which rests on the core barrel flange 58.

As shown in FIGS. 1 and 12, the alignment among the vessel, the upper internals and the lower internals in the horizontal direction—that is, along a plane perpendicular to the longitudinal axis of the reactor—is set at the top of the core barrel 5. This alignment is obtained by a head and vessel alignment pins 50, which are affixed to the core barrel flange 58 by screws 78 and which extends into notches 75 and 76 formed in the control rod support plate flange 59 and the vessel flange 57, respectively. This alignment is checked at assembly by measuring the clearance between the pin 50 and the notches 75 and 76—typically, the clearance between the pin 50 and the notch 75 should be approximately 0.041 cm (0.016 inch) and the clearance between the pin 50 and the notch 76 should be about 0.081 cm (0.032 inch). Four pins 50 are disposed about the circumference of the core barrel flange 58 so that proper alignment is attained in each direction along a plane perpendicular to the longitudinal axis of the reactor.

Figure 8:
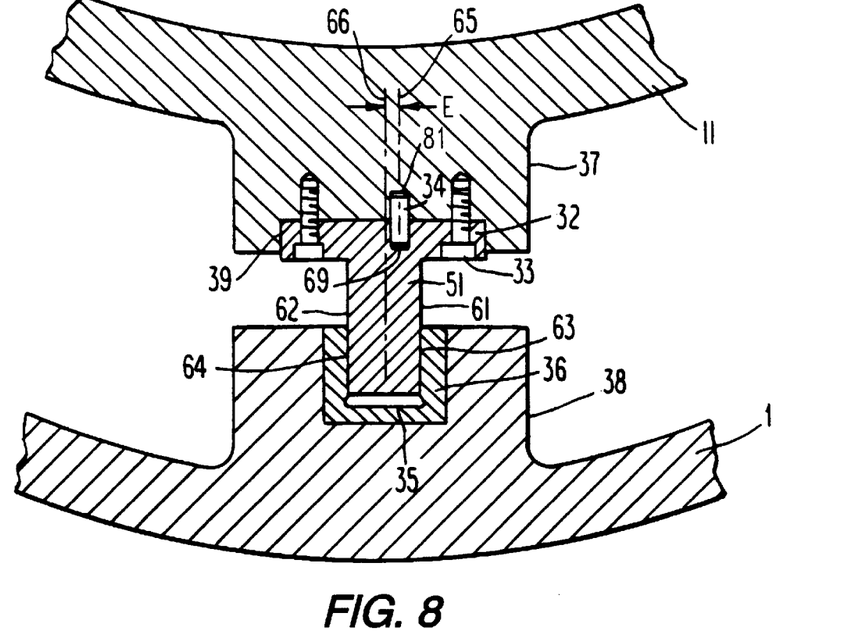
FIG. 8 is a cross-section taken through line VIII—VIII shown in FIG. 1.

The core barrel 5 is also aligned to the pressure vessel 1 at its bottom 11 by a radial support key 32, as shown in FIG. 8. A specially machined insert 36, having a keyway 35 formed therein, is disposed within a slot formed in a boss 38 protruding radially from the inner surface of the vessel 1. The key 32, affixed to a mounting pad 39 formed in a boss 37 protruding radially from the outer surface of the core barrel bottom 11, mates with the keyway 35, thereby aligning the core barrel 5 to the vessel 1.

Correct alignment of the core barrel 5 is achieved at initial assembly by positioning it within the vessel 1 so that when the head and vessel alignment pins 50 are properly engaged in the notches 76 in the vessel flange 57, the radial gaps between the core barrel discharge nozzles 73 and the pressure vessel discharge nozzles 16 are equalized around the circumference of the reactor. This alignment is then set by custom machining each insert 36 so that the proper clearance between the sides 61, 62 of the key 32 and the sides 63, 64 of the keyway 35 is obtained—typically, this clearance should be approximately 0.038 cm (0.015 inch). Six such keys and keyways are formed about the circumference of the core barrel 5 and vessel 1 to ensure proper alignment in all directions in a plane perpendicular to the longitudinal axis of the reactor. In some plants, there are four such keys and keyways. Note that the base portion of each key 32 is affixed to its mounting pad 39 by screws 33, its location being precisely maintained by a dowel 34.

Figure 3:
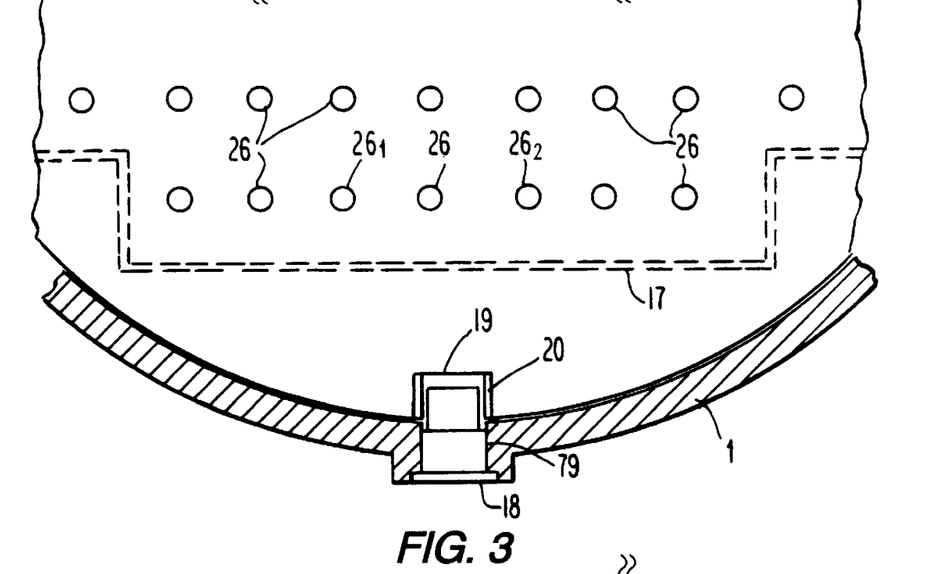
FIG. 3 is a plan view of the upper core plate shown in FIG. 2 in the vicinity of the alignment pin.

The proper alignment of the upper internals to the lower internals is obtained by four upper core plate alignment pins 18 disposed about the circumference of the core barrel 5, as shown in FIGS. 1 and 2. As shown in FIG. 3, each pin 18 penetrates through a hole 79 in the core barrel and extends into a notch 19 formed in the periphery of the upper core plate 8. A specially machined insert 20 is mounted in each notch so that a small clearance can be obtained between the sides of the notch 19 and the pin 18—typically, this clearance should be approximately 0.015 cm (0.006 inch) at assembly.

The fuel assemblies 14 are aligned to the upper internals via alignment pins 7 disposed in the upper core plate 8, as shown in FIGS. 1 and 2. Two pins 7 are utilized for each fuel assembly 14. Each pin 7 extends into a fuel assembly through a hole 26, shown in FIG. 3, in the upper core plate 8. According to the current invention, the period of time for which the reactor must be out of service, and the exposure of maintenance personnel to radioactivity, required to replace the lower internals and achieve the alignments described above can be minimized by using the methods and apparatus discussed below.

Figure 9:
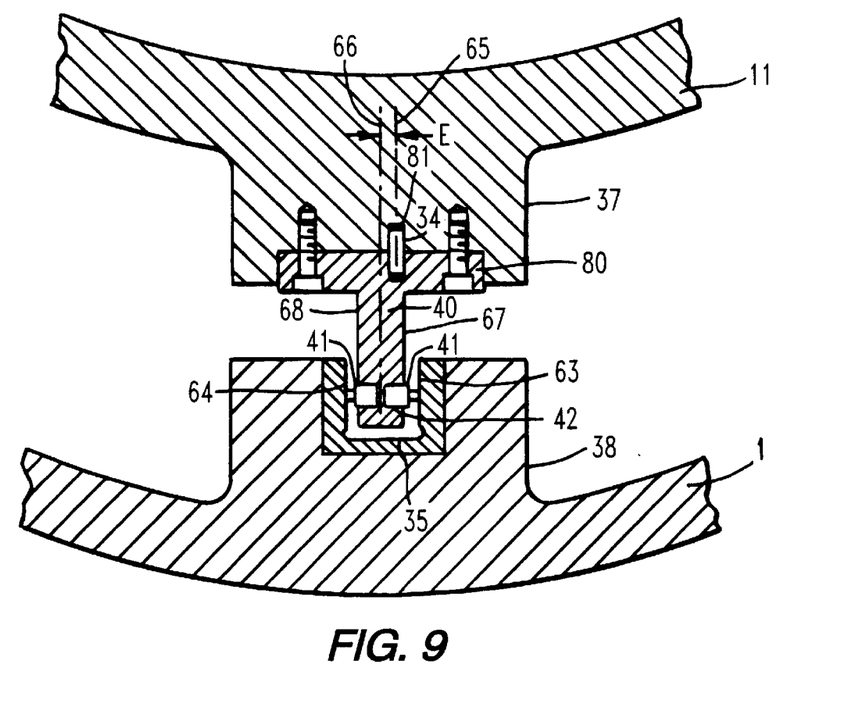
FIG. 9 shows the same view as FIG. 8, but with the radial support key alignment gage installed.
Figure 11:
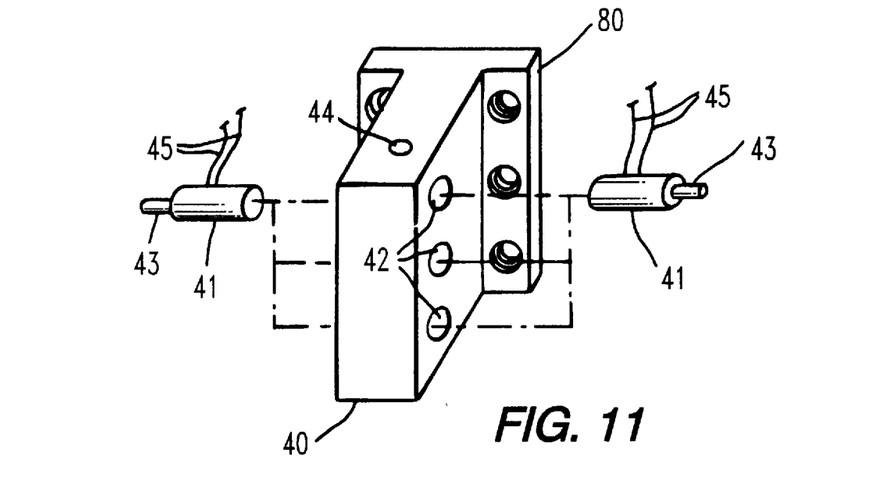
FIG. 11 is an isometric view of the radial support key alignment gage shown in FIG. 9.
Figure 13:
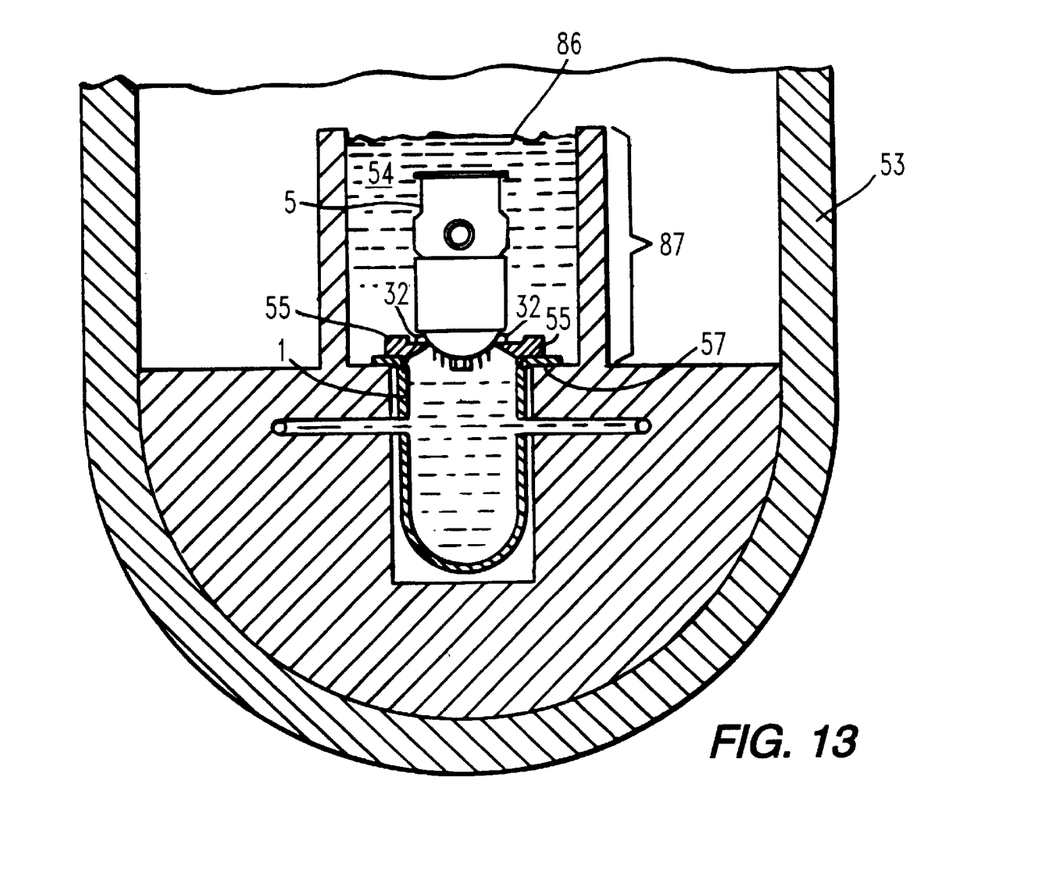
FIG. 13 is a vertical cross-section through the containment of the nuclear power plant showing the core barrel positioned above the reactor vessel in the reactor cavity.
Figure 14:
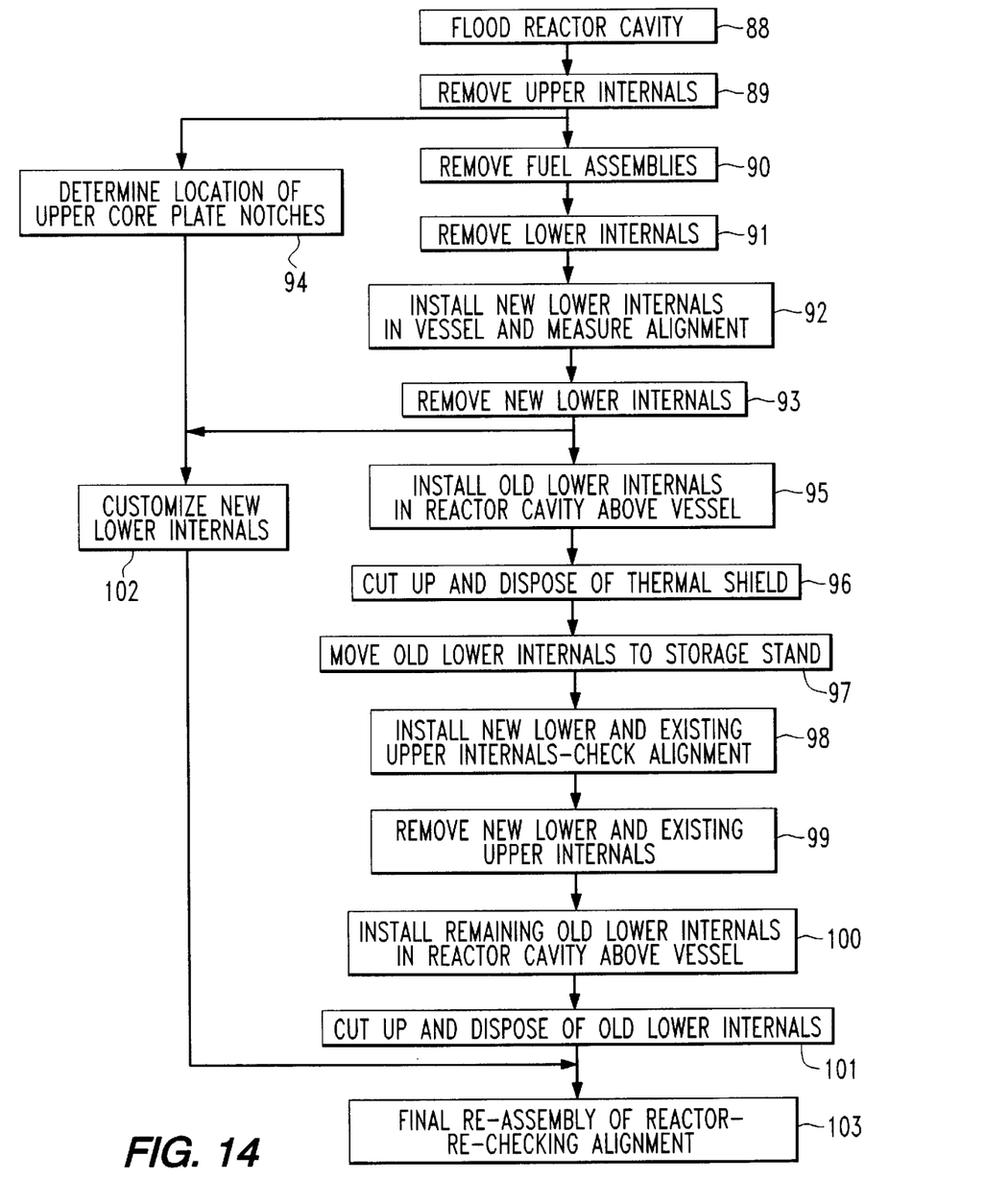
FIG. 14 is a flow chart showing the steps for replacing the lower internals.

As indicated by steps 88–91 in FIG. 14, the reactor cavity 54, shown in FIG. 13, is flooded with water before the upper and lower internals have been removed from the vessel 1. The new core barrel 5 is aligned to the vessel 1 at the radial support keys 32 by installing the new core barrel 5 into the pressure vessel 1 with radial support key gages 40, one of which is shown in FIGS. 9 and 11, mounted on the mounting pads 37 in place of the radial support keys. Using the gage 40, the alignment of the new core barrel 5 to the vessel 1 is determined remotely—that is, without maintenance personnel having physical access to the key/keyway area. Based on this information, one next determines the location of the radially extending portion 51 of the radial support key 32 with respect to the core barrel which is required to obtain the proper alignment—that is, to obtain the aforementioned clearance between the key and the keyway 35. A new radial support key 32 is then modified so that its radially extending portion 51 is in the correct location when the key is doweled to the core barrel.

Thus, in step 92, the new core barrel 5 is lowered into the vessel with a radial support key gage 40 mounted onto each of the six radial support key mounting pads 37, as shown in FIG. 9. A dowel 34, extending into a hole in the base portion 80 of the gage 40, serves to accurately locate the gage onto the mounting pad 37. As shown in FIG. 11, six linear voltage differential transformers (LVDTs) 41, two of which are shown in the figure, are mounted in holes 42 in the sides of the gage 40. The lead wires 45 for the LVDTs 41 are lead out of the gage through a vertical hole 44 extending through the gage.

When the core barrel 5 is lowered into the vessel 1, the voltage to each LVDT 41 is maintained so as to keep the LVDT plungers 43 in their retracted positions with the tips of the plungers 43 flush with the surfaces 67, 68 of the gage 40. As can be seen by comparing FIGS. 8 and 9, the thickness of the radially extending portion of gage 40 is thinner than that of the radial support key 32, so that the gage fits easily into the keyway 35. After the core barrel flange 58 is seated on the vessel flange 57 and the core barrel 5 is correctly alignment to the vessel 1, the voltage to each LVDT 41 is increased until the plungers contact the sides 63, 64 of the keyway 35. The extension of the plunger can be viewed remotely by an underwater television camera 49, such as that shown in FIG. 10 being used for another purpose, to ensure that the plungers properly contact the keyway sides 63, 64.

By measuring the change in voltage supplied to the LVDTs 41, the distance which the LVDT plungers traveled, and, therefore, the distance from the each face 67, 68 of the key gage 40 to each side 63, 64 of the keyway 35 can be determined. Combining these distances with the thickness of the radially extending portion of the gage 40, measured conventionally, allows one to determine the width of the keyway 35 and the distance, shown as dimension E in FIGS. 8 and 9, from the centerline 66 of the keyway to the dowel hole 81 in the boss 37.

Using the data obtained as described above, the new lower internals can be customized on-site, as indicated in step 102 of FIG. 14. Customization is achieved by modifying six new radial support keys 32 so that each is specially adapted to mate with one of the keyways 35. This modification consists of specially machining the keys so that (i) the thickness of the radially extending portion of the key is such that the aforementioned clearance of approximately 0.038 cm (0.015 inch) between the key and the sides of the keyway can be obtained and (ii) the distance from the centerline of the radially extending portion of the key to the dowel hole 69 in the base portion of the key, which serves to locate the key, is such that centerline of the key coincides with the centerline 66 of the keyway, as indicated in FIG. 8.

Although the procedure described above has been discussed in the context of a key/keyway alignment device, it should be clear that the current invention is equally suited for use with other alignment devices, such as radial contact pads dispersed about the periphery of the core barrel 5 which mate with bosses formed on the inside diameter of the pressure vessel 1. Also, although LVDTs 41 are utilized in the preferred embodiment to remotely measure the distance from the key gage 40 to the sides of the keyway 35, this measurement could also be taken by mechanical means—for example, by using pins which are mechanically extended using screw threads and which are locked in place by set screws so that their extension can be measure after the core barrel 5 has been removed from the vessel 1.

Figure 15:
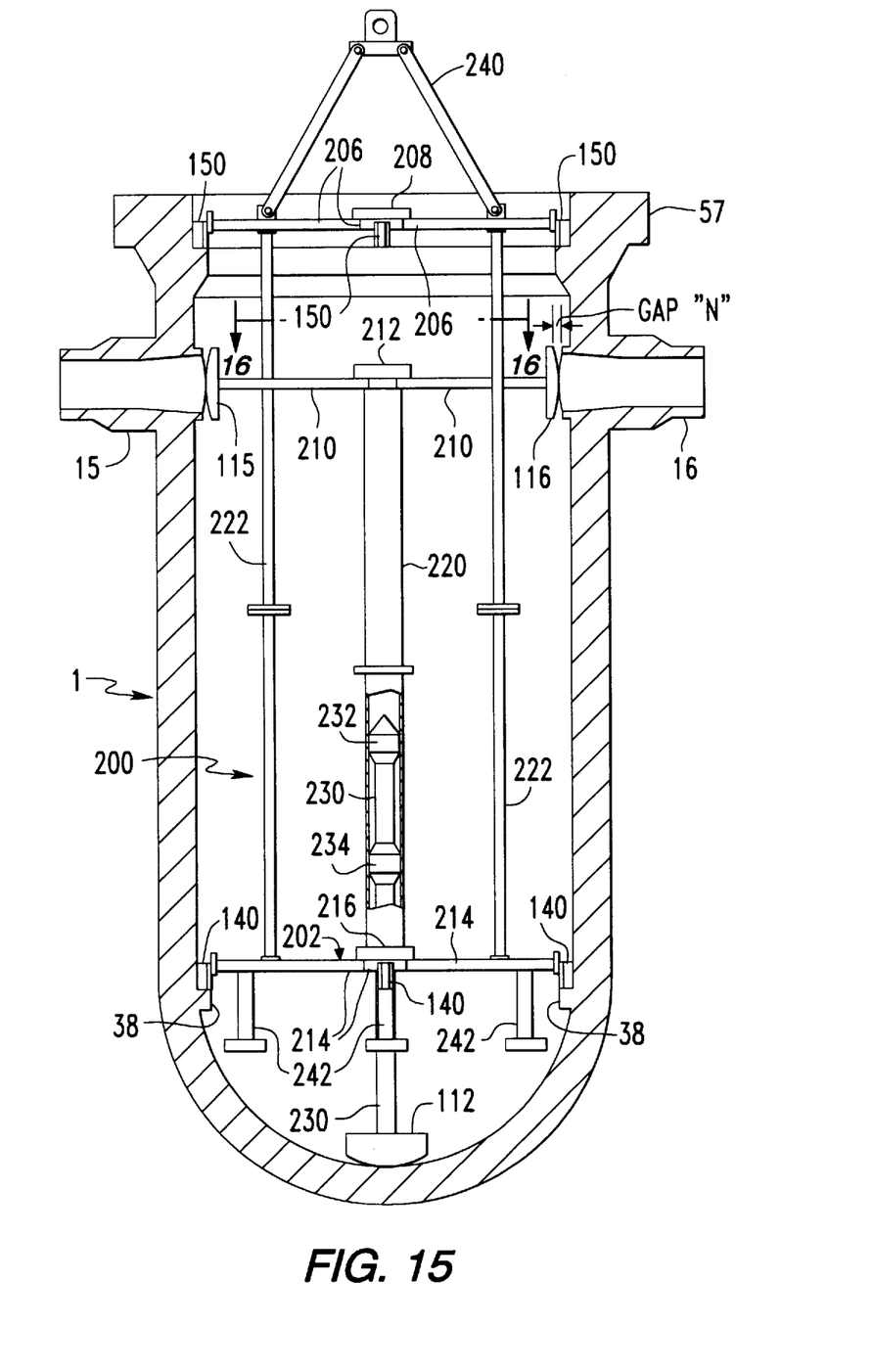
FIG. 15 is a partially fragmentary elevational view of a simulated lower internals gage in the nuclear reactor vessel shown in FIG. 1.
Figure 16:
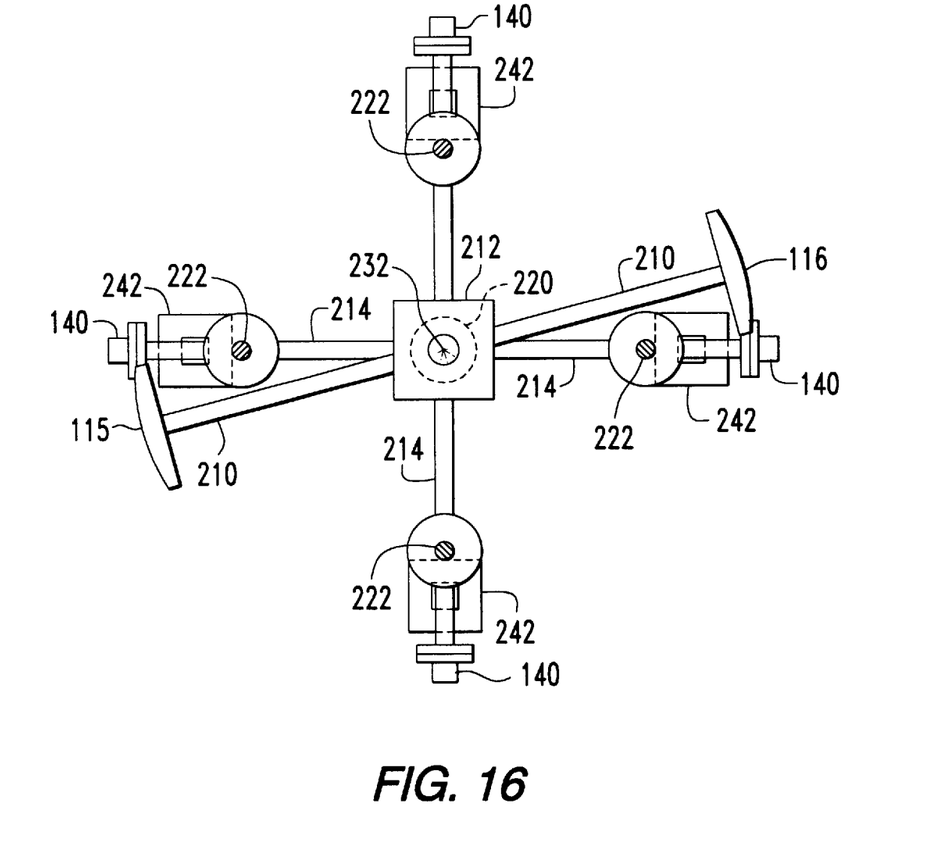
FIG. 16 is a sectional view of the simulated lower internals gage of FIG. 15 taken through line XVI—XVI.
Figure 17:
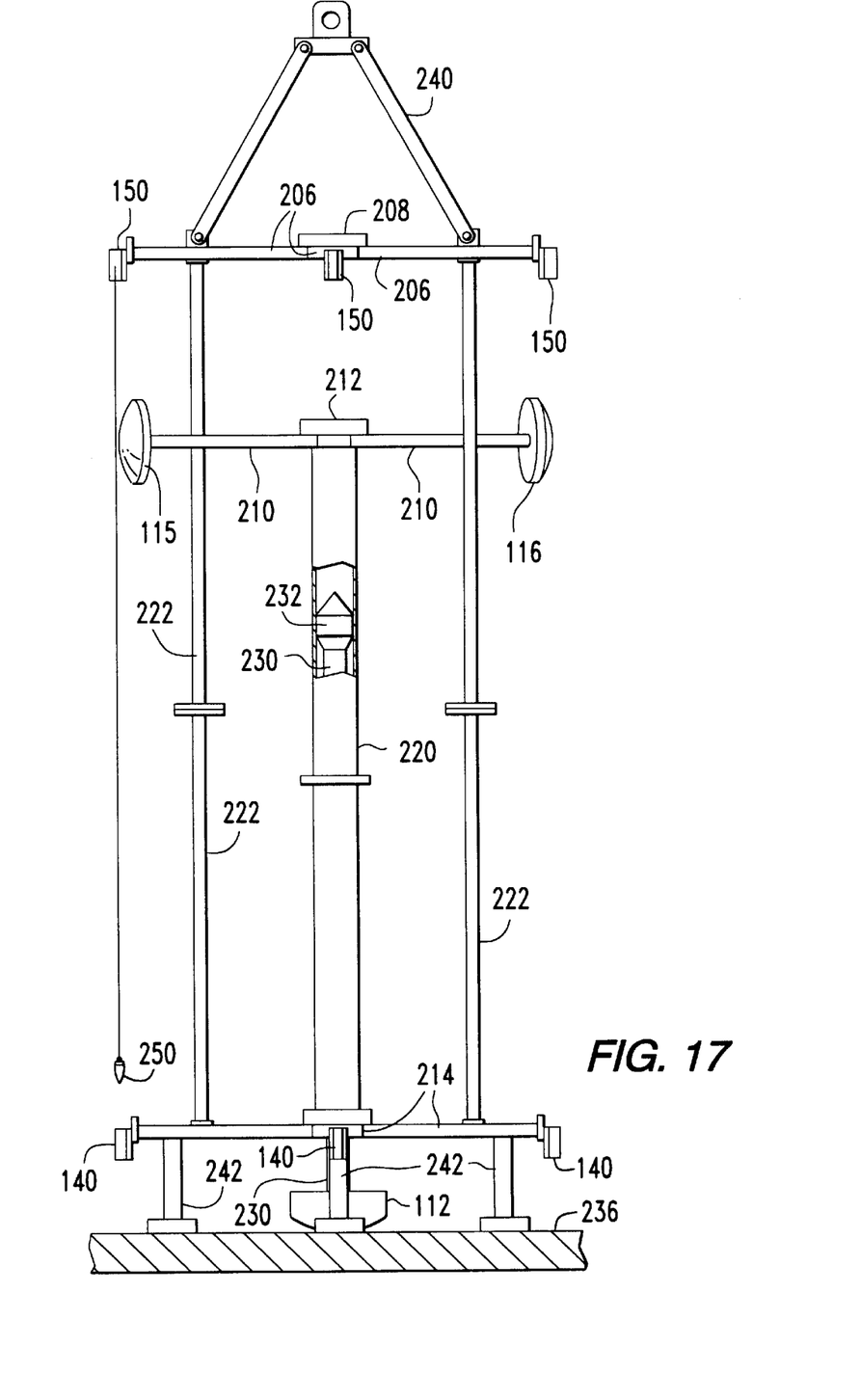
FIG. 17 is a partially fragmentary elevational view of the simulated lower internals gage of FIG. 15 located on a stand out of the reactor vessel.

FIGS. 15–17 show an embodiment of the process for taking critical measurements in the pressure vessel which does not use the new lower internals as a gage, but rather a gage which simulates the important features on the replacement internals. This aspect of the invention opens up more possibilities for the exchange of lower internals:

(1) Measurement (gaging) of the candidate vessel can be done during a plant outage, such as a scheduled inservice inspection where the lower internals are removed from the pressure vessel and placed in a storage stand. With the lower internals in the stand, the distance between the core barrel flange seating surface and the bottom of the energy absorber (see 12, FIG. 1) can also be measured using conventional methods. The replacement internals can then be manufactured completely while the plant continues to operate. When the change-out is scheduled, the new lower internals arrive ready for installation; a considerable savings in outage time.

(2) A set of new lower internals, complete with lower radial support keys may already exist (possibly from plant cancellations). Vessel dimensions taken with the simulated lower internals gage can then be used to modify the lower radial support keys, the energy absorber, and the core barrel outlet nozzles as-needed to achieve the desired fits in the vessel. Again, plant outage time would be reduced if the replacement lower internals arrived at the plant site with all modifications complete.

FIG. 15 shows a simulated lower internals gage 200 located in a reactor vessel 1 having two outlet nozzles 15 and 16 (represented by one outlet nozzle 15 and one inlet nozzle 16) and four lower radial supports 38. As shown in FIG. 15, the gage 200 have four gage blocks 140 simulating the lower radial support keys 32 shown in FIGS. 1 and 8 (and used in place of gages 40 shown in FIGS. 9 and 11) and four gage pins 150 simulating the head and vessel alignment pins 50 of FIGS. 1 and 12. The gage 200 also has two simulated outlet nozzle connections 115 and 116 adjacent vessel outlet nozzles 15 and 16 and a simulated energy absorber base plate 112. These simulated features of the gage 200 are supported by a rigid main frame 202, including four horizontal members 206 extending from an upper plate the assembly 208 for supporting the gage pins 150, four horizontal members 210 (of which two are shown) extending from a middle plate (represented by one connection 115 and one connection 116) assembly 212 for supporting the simulated outlet connections 115 and 116 and four horizontal members 214 extending from a lower plate assembly 216 for supporting the gage blocks 140. These horizontal structural members are reinforced by a hollow central column 220 and four vertical members 222. Each of the vertical members 220 and 222 may be fabricated of several flanged short members as is shown or may be one long member.

The simulated energy absorber base plate 112 is attached at the lower end of a vertical column 230 for slidable movement relative to the hollow central column 220 when the gage 200 is positioned in the reactor vessel 1 shown in FIG. 15. The vertical column 230 has two large diameter sections 232 and 234 for guiding the column 230 as it moves within the hollow central column 220 and a bore (not shown) within the lower plate assembly 216. Preferably, the lower guiding section 234 is larger than the bore in the lower plate assembly 216 in order to limit relative vertical movement of the simulated energy absorber base plate 112 relative to the main frame 202 as the gage 200 is moved between the reactor vessel 1 and the stand 236 (shown in FIG. 17). The main frame 202 also has a lift rig 240 for transporting the gage 200 and support legs 242 for providing support on the stand 236.

The gage blocks 140 are precisely located on the main frame 202 of the gage 200 to extend radially into the vessel keyways 35 shown in FIG. 9. The gage blocks 140 may deploy the LVDTs 41 shown in FIG. 11, and measurements can be taken in the same fashion as when new lower internals are employed to provide the base for these keyway gages. The four pins 150 located on the theoretically true centerline of the upper section of the gage to simulate the head and vessel alignment pins 50 shown in FIG. 1. However, the gage pins 150 are preferably fit the vessel keyways such that the clearance 76 shown in FIG. 12 will be approximately 0.006 in. (0.152 mm) per side rather than the 0.032 in. (0.813 mm) design value. The simulated lower internals gage 200 may be leveled and supported at the pressure vessel flange surface where the lower internals assembly flange seats. It is important to note that gage blocks 140 are positioned on the same horizontal centerline as pins 150 above. When gap measurements are then taken in the vessel keyways 76, the centerline of the keys 66 can then be established with respect to the centerline of the keyways 76 in the vessel 1 above, occupied by pins 150. Translated to the replacement lower internals, the lower radial support keys 32 can then be assembled (or modified if already assembled), to coincide with the head and vessel alignment pins 50 in the same relationship as the pressure vessel measurements have dictated, with clearances as specified by the designers. (As an alternate to using LVDTs 41 as the vessel keyway measuring device, gage blocks which are machined to fill the keyway completely with only enough clearance to permit engagement may be employed (not shown); these blocks, rather that being fixed to the simulated lower internals gage 200 can be moved (remotely) along the gage surface and dropped into the vessel keyways and locked in place.) Upon removal of the gage 200 from the pressure vessel 1, the gage 200 can be placed on the reactor cavity operating deck, leveled, and then measurements relating to the centers of the gage blocks to the simulated head and vessel alignment pins 150 above can be made. These measurement can be achieved by optics/targets using a Theodolite targeting scope or the simple expedient of a wire plumb bob 250 hung from the center of each simulated head and vessel alignment pin 150 in the gage 200. See FIG. 17. The offset of each lower radial support key with respect to the head and vessel alignment pin 150 on the core barrel flange can then be established on the new lower internals.

As previously discussed, in addition to aligning the new core barrel 5 to the vessel, the new core barrel must also be aligned to the upper internals at the upper core plate alignment pins 18. According to the current invention, this alignment is achieved by determining the location of the notches 19 in the upper core plate 8 relative to the fuel assemblies 14. Since the fuel assemblies are off-loaded during the alignment procedure, the locations of the notches relative to the fuel assemblies is not determined directly. Instead, the locations of the notches relative to the fuel assembly alignment pin holes 26 are determined since their locations are indicative of the locations of the fuel assemblies. This information is then used to locate the holes 79 to be drilled in the new core barrel 5 to retain the alignment pins 18. This procedure ensures that, at final assembly, the fuel assemblies will be properly centered within the baffle 17 of the new core barrel 5.

Figure 5:
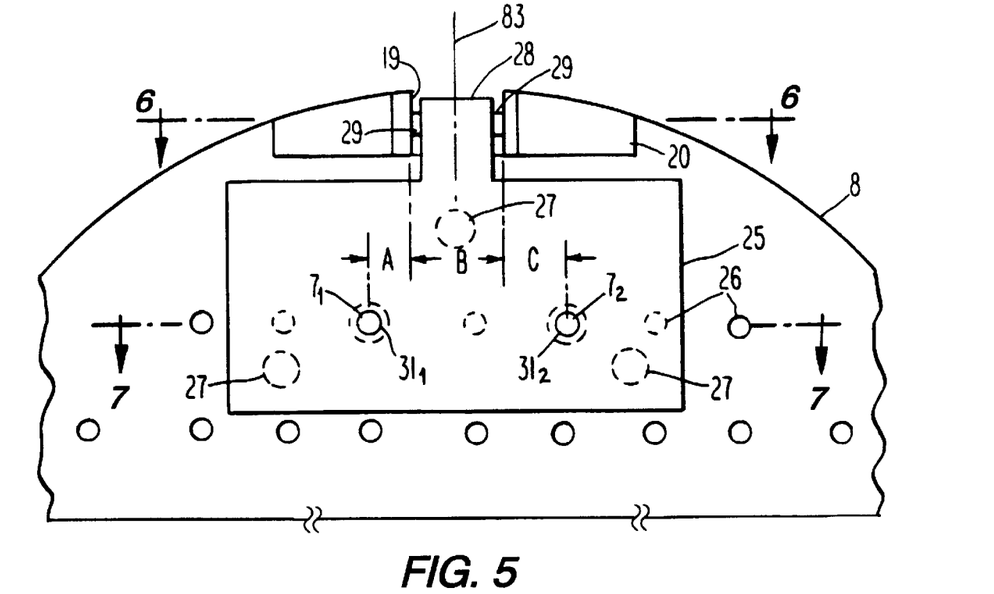
FIG. 5 is a plan view from below of the upper core plate shown in FIG. 3 with the alignment pin hole locating gage installed.
Figure 7:
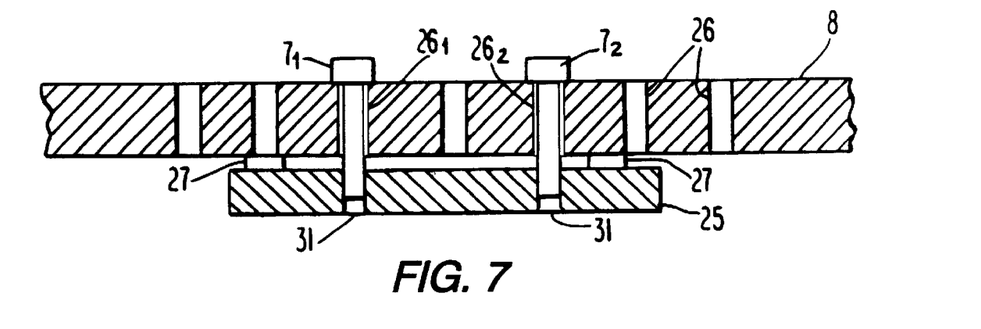
FIG. 7 is a cross-section taken through line VII—VII shown in FIG. 5.

The determination of the notch locations is performed in step 94 of FIG. 14, after the upper internals have been removed from the vessel in step 89. The locations of the notches 19 are determined by mounting an alignment pin gage 25 on the underside of the upper core plate 8 at each notch location, as shown in FIG. 5. As shown in FIGS. 5 and 7, two close clearance holes $31_1$ and $31_2$ are formed in gage 25. These holes are spaced so as to coincide with two fuel assembly alignment pin holes $26_1$ and $26_2$ in the upper core plate. This allows the two fuel assembly alignment pins $7_1$ and $7_2$ to extend into holes $31_1$ and $31_2$, respectively, so as to precisely locate the gage on the upper core plate 8. Three leveling pads 27, two of which are shown in FIG. 7, ensure that the gage rests stably on the underside of the upper core plate 8.

Figure 6:
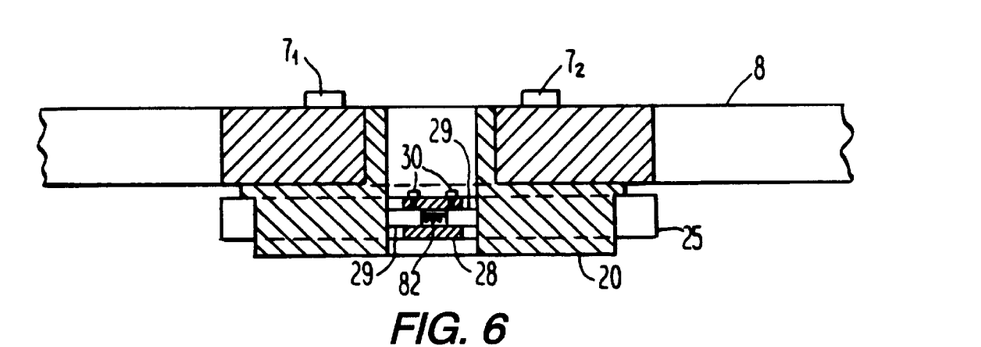
FIG. 6 is a cross-section taken through line VI—VI shown in FIG. 5.

The alignment pin gage 25 is mounted on the upper core plate 8 so that a tongue 28 emanating from the gage extends into the notch 19, as shown in FIGS. 5 and 6. Unscrewing two set screws 30 in the tongue 28, releases plungers 29 disposed in either side of the tongue, allowing a spring 82 to drive the plungers against the sides of the notch 19. The set screws 30 are then tightened to lock the plungers 29 into place and the gage 25 is withdrawn from the upper core plate 8. The location of the centerline 83 of the notch 19 relative to the holes $31_1$ and $31_2$ in the gage 25 is determined by measuring (i) the distance from the tip of each plunger 29 to the nearest hole 31, shown as dimensions A and C in FIG. 5, and (ii) the distance across the plunger tips, shown as dimension B in FIG. 5.

Figure 4:
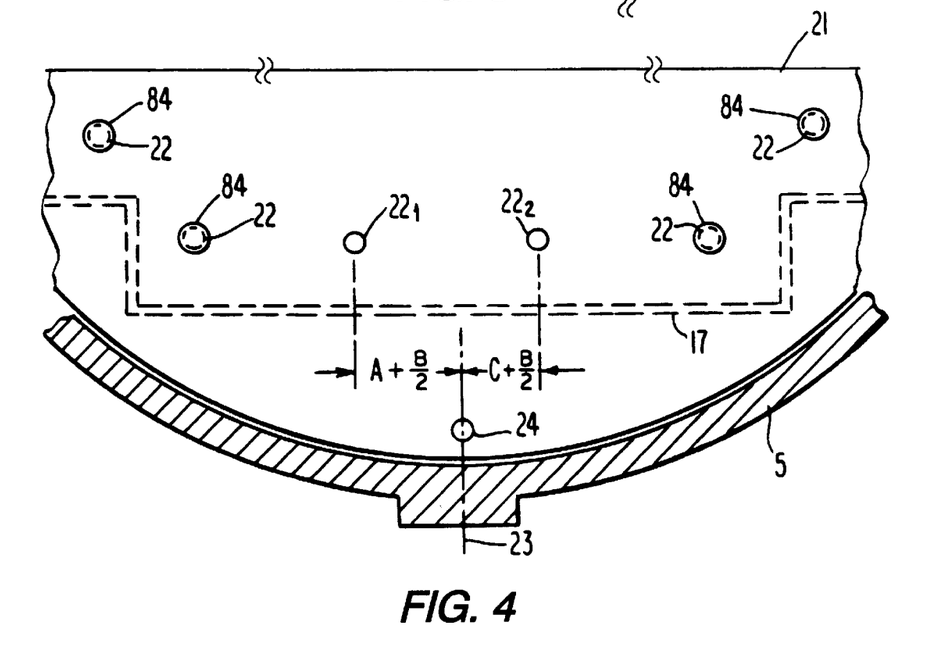
FIG. 4 is a plan view of a dummy upper core plate as installed in the new core barrel.

The measurements obtained above are transferred to a dummy core plate 21, shown in FIG. 4. The dummy core plate 21 is the same size and shape as the upper core plate 8 and has a plurality of holes 22 formed therein which are the same size as the fuel assembly alignment pin holes 26 in the upper core plate. Although there are fewer holes 22 in the dummy core plate 21 than there are fuel assembly alignment pin holes 26 in the upper core plate 8, each hole 22 corresponds to one of the outer most fuel assembly alignment pin holes 26—that is, to one of the holes 26 closest to the periphery of the upper core plate. The location of each hole 22 relative to the dummy core plate 21 is the same as the location of its corresponding fuel assembly alignment pin hole 26 relative to the upper core plate 8. Thus, in effect, the holes 22 in the dummy core plate 21 form a pattern which matches the periphery of the aggregation of fuel assemblies 14 which form the core 71.

The measurements A, B, and C are transferred onto the dummy core plate 21 and used to locate the centerline 23 of the notch 19 relative to holes $22_1$ and $22_2$ which correspond to the two holes $26_1$ and $26_2$ through which the pins $7_1$ and $7_2$ were inserted to mount the gage 25 on the upper core plate 8, as shown in FIG. 4. A hole 24 is drilled in the dummy core plate 21 along centerline 23 and, as explained below, is used as a reference point for drilling the hole 79 for the alignment pin 18. This procedure is repeated for each of the four notch 19 locations on the upper core plate 8 so that the dummy core plate 21 has four holes 24, each corresponding to the location of a notch 19 relative to the fuel assembly alignment pin holes 26.

Next, the dummy core plate 21 is installed into the new core barrel 5, as shown in FIG. 4. The dummy core plate 21 is positioned in the core barrel 5 so that dummy fuel assembly alignment pins 84, inserted into the holes 22, are spaced equidistance from the baffle 17. Holes 24 are then used as reference points for drilling alignment pin holes 79 in the core barrel 5 as part of the customization of the new lower internals, as indicated in step 102 of FIG. 14.

The procedure described above has two important aspects. First, the holes $22_1$ and $22_2$ used to locate holes 24 correspond with the holes $26_1$ and $26_2$ used to align the fuel assemblies 14 to the upper core plate. Second, the holes 79, through which the alignment pins 18 extend, were located by centering the holes $22_1$ and $22_2$ relative to the when the fuel assemblies 14 are installed into the new core barrel 5 and the alignment pins 18 are inserted into the notches 19 in the upper core plate, the fuel assembly alignment pins 7 in the upper core plate will properly align that the clearance between the baffle and the fuel assemblies is only approximately 0.16 cm (0.06 inch), hence the need for careful alignment.

According to the current invention, the alignment measurements on the existing upper core plate 8, taken using the dummy core plate 21, can be taken during a refueling outage prior to the outage during which the lower internals will be replaced, thereby eliminating a considerable amount of time from the lower internals replacement outage.

Figure 10:
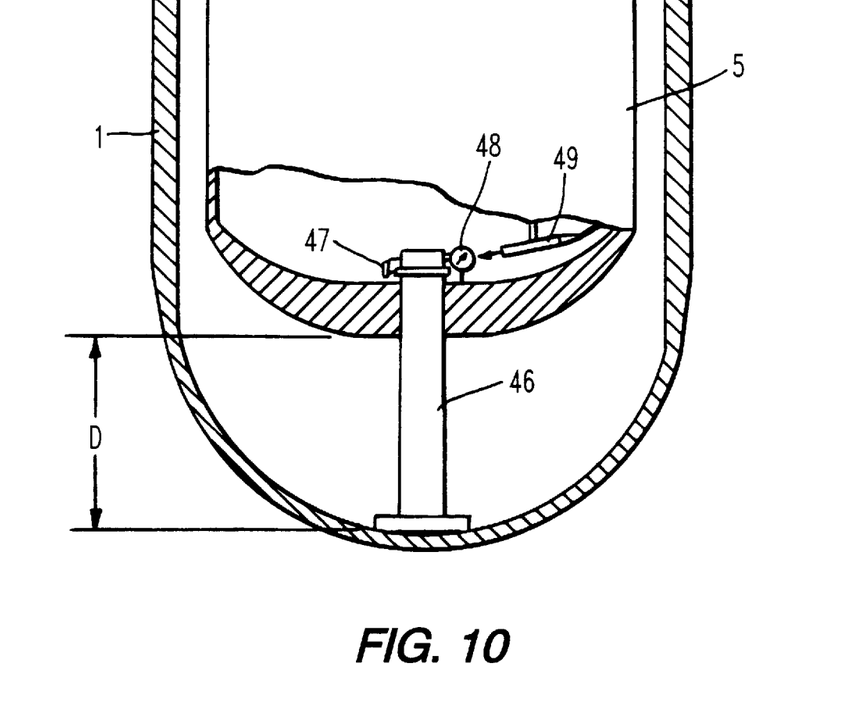
FIG. 10 is a vertical cross-section in the vicinity of the lower portion of the pressure vessel and core barrel, showing the energy absorber length gage.

In order to ensure that the energy absorber 85, shown in FIG. 1, can adequately absorb the impact should the core barrel drop onto the bottom of the vessel 1, a clearance of approximately 2.84 cm (1.12 inch) is maintained between the plate 12 and the inside surface of the vessel bottom. To ensure that this clearance is obtained, the length of the support columns 60 of the energy absorber 85 is custom fitted to the new core barrel 5. This custom fitting requires that the distance between the core barrel bottom 11 and the vessel bottom be accurately measured. According to the current invention, this measurement is obtained by slidably mounting a gage 46 into the new core barrel, as shown in FIG. 10. As shown in FIG. 10, a scratch gage 47 and dial indicator 48 are attached to the gage 46. As the core barrel is lowered into the vessel during step 92, the bottom of the gage 46 contacts the vessel bottom so that the gage slides up the core barrel. The dial indicator 48 is remotely observed through an underwater television camera 49. When the core barrel flange 58 has been properly seated on the vessel flange 57, the reading on dial indicator 48, indicating the distance the gage 46 has slid up the core barrel, is observed. The scratch gage 47 provides a permanent record of this indication as a backup. By subtracting the dial indicator reading from the distance by which the gage originally protruded from the core barrel, the distance D between the core barrel bottom and the vessel bottom is determined. The length of the energy absorber 85 is then adjusted accordingly as part of the customization indicated in step 102 of FIG. 14.

After the old lower internals have been removed, they must be disposed of. Thus, according to the current invention, in step 95 the old lower internals are returned to the reactor cavity after the alignment measurements have been performed on the new lower internals in step 92, so that the disposal work can proceed in parallel with the customization of the new lower internals in step 102. As shown in FIG. 13, when the old lower internals are returned to the reactor cavity 54, the core barrel 5 is supported off the vessel flange 57 by support pedestals 55 attached to the flange—preferably three support pedestals 55 are used. Alternatively, the core barrel 5 could be suspended from an I-beam disposed across the top of the reactor cavity 54. Note that, according to the current invention, in step 88 the reactor cavity 54 is flooded to a water level 86 such that the depth 87 of water above the vessel flange 57 is greater than the length of the core barrel 5. Thus, although supported above the vessel flange, the entire core barrel 5 remains submerged.

Disposal of the thermal shield 6 is performed first in step 96. With the core barrel 5 submerged in the reactor cavity 54, four longitudinal cuts are made in the thermal shield 6, thereby cutting it into four accurate segments. Next, a circumferential cut is made around the thermal shield, thereby creating eight accurate segments which can be conveniently placed into a cask for disposal. The underwater cutting of the thermal shield 6 may be done using a plasma arc technique.

After the thermal shield 6 is removed, the old lower internals are moved from the position above the vessel 1 and placed in an under water storage stand (not shown) in the reactor cavity 54 in step 97. This allows the new lower internals, having been customized in step 102, to be returned to the vessel 1 in step 98 so that the attainment of the correct alignment can be verified. In the unlikely event that the new internals do not fit properly, the old lower internals, minus the thermal shield, can be reinstalled and the reactor returned to service after fueling for another operating cycle while the new lower internals are being reworked. Thus, by removing the thermal shield in parallel with the customizing of the new lower internals, the time required to remove the thermal shield is not added to the critical path. Moreover, this scheduling benefit is obtained without risking a delay in the timely return of the reactor to service should unanticipated problems in the customizing operation arise.

After the alignment of the new lower internals has been verified, they are again removed from reactor cavity 54 in step 99 and the old lower internals, less the thermal shield 6, are returned to the reactor cavity in step 100 and again supported on the vessel flange 57 as shown in FIG. 13. In step 101 the old core barrel 5 is then cut into at least three sections by a series of circumferential cuts. In the preferred embodiment, cuts are made just below the discharge nozzle 73, and just above the lower core plate 9. Since the portion below the lower core plate 9 is the heaviest of the sections, it may be necessary to make further cuts in this section depending on crane capacity. Each section is then placed in a water filled cask for disposal.

After disposal of the old lower internals in step 101, the reactor cavity 54 and vessel 1 are cleaned up and the new lower internals reinstalled in the vessel for final assembly in step 103, the alignment being re-checked during the final assembly process.

The present invention may be embodied in other specific forms without departing from the spirit or essential attributes thereof and, accordingly, reference should be made to the appended claims, rather than to the foregoing specification, as indicating the scope of the invention.

We claim:

1. A method of replacing a previously used lower internals assembly in a nuclear reactor pressure vessel with replacement lower internals assembly comprising the steps of:

remotely determining the alignment of said replacement lower internals assembly with said pressure vessel at a first aligning means; and then forming said first aligning means so as to obtain a predetermined alignment of said replacement internals assembly with said pressure vessel based upon said remote alignment determination.

2. The method according to claim 1 including the step of employing a simulated replacement lower internals assembly in order to remotely determine the predetermined alignment of said replacement lower internals assembly.

3. In a nuclear reactor having a pressure vessel and old and new lower internals assemblies adapted to be enclosed by said pressure vessel and support a core assembly, said new lower internals assembly having first means for aligning said new lower internals assembly to said pressure vessel, a method for replacing said old lower internals assembly with said new lower internals assembly, comprising the steps of:

a) remotely determining the alignment of said new lower internals assembly to said pressure vessel at said first aligning means; and b) forming said first aligning means so as to obtain a predetermined alignment of said new lower internals assembly to said pressure vessel based on said remote alignment determination.

4. The method according to claim 3 wherein said first aligning means comprises a plurality of mating pairs of first and second alignment members, said first alignment members dispersed about the inside surface of said pressure vessel and said second alignment members dispersed about the outside surface of said lower internals assembly, and wherein the step of determining the alignment of said new lower internals assembly to said pressure vessel comprises the step of determining the location of said second alignment members on said new lower internals assembly required to obtain said predetermined alignment.

5. The method according to claim 3 wherein said first aligning means comprises a key adapted to engage a keyway formed in said pressure vessel, and wherein the step of determining the alignment of said new lower internals assembly to said pressure vessel comprises the step of determining the location of said key on said new lower internals assembly required to obtain said predetermined alignment.

6. The method according to claim 5 wherein the step of determining said location of said key comprises the steps of:

a) affixing a gage to said new lower internals assembly in place of said key; and b) installing said new lower internals assembly into said pressure vessel; and c) determining the distance from said gage to said keyway.

7. The method according to claim 6 wherein said keyway has sides formed therein, said gage has a plunger tip capable of retracting and extending, and:

a) the step of installing said new lower internals assembly into said pressure vessel is performed with said plunger in a retracted position; and b) further comprising the step of extending said plunger tip until said tip contacts one of said keyway sides.

8. The method according to claim 6 wherein the step of forming said first aligning means so as to obtain said predetermined alignment comprises the step of machining said key based on the distance from said gage to said keyway.

9. The method according to claim 3 wherein said nuclear reactor has (i) a core containing fuel assemblies, (ii) control rods, and (iii) an upper internals assembly adapted to guide said control rods, said core and said upper internals assembly being enclosed within said pressure vessel, said new lower internals assembly and said upper internals assembly having second and third means, respectively, for aligning said new lower internals assembly to said upper internals assembly, and further comprising the step of locating said second aligning means on said lower internals assembly so as to obtain a predetermined alignment of said new lower internals assembly to said upper internals assembly.

10. The method according to claim 9 wherein said third aligning means comprises a notch formed in said upper internals assembly and wherein the step of locating said second aligning means comprises the step of determining the location of said notch relative to said fuel assemblies.

11. The method according to claim 10 wherein said upper internals assembly further comprises a first pin for each of said fuel assemblies, a first hole formed in said upper internals assembly for each of said first pins, each of said first pins disposed in its respective first hole, and the step of determining the location of said notch relative to said fuel assemblies comprises the step of determining the location of said notch relative to one of said first holes.

12. The method according to claim 11 wherein the step of determining the location of said notch relative to one of said first holes comprises the step of mounting a gage onto said upper internals assembly using said first pins to locate said gage.

13. The method according to claim 12 wherein said notch has sides, said gage has a plunger tip capable of retracting and extending, and wherein:

a) the step of mounting said gage onto said upper internals assembly comprises the step of inserting said gage into said notch and extending said plunger tip until said tip contacts one of said sides of said notch; and b) the step of determining the location of said notch relative to one of said first holes further comprises the step of measuring the distance from said plunger tip to said first hole.

14. The method according to claim 11 wherein the step of locating said second aligning means on said lower internals assembly so as to obtain said predetermined alignment further comprises the step of locating a reference point on a dummy upper internals assembly having a plurality of second holes, the location of said reference point relative to one of said second holes being the same as the location of said notch relative to one of said first holes, the position of said second holes relative to said dummy upper internals assembly being related to the position of said first holes relative to said upper internals assembly.

15. The method according to claim 14 wherein said second aligning means comprises a second pin disposed in a third hole in said lower internals assembly and adapted to engage said notch, and the step of locating said second aligning means on said lower internals assembly so as to obtain said predetermined alignment further comprises the steps of:

a) installing said dummy upper internals assembly onto said lower internals assembly; and b) drilling said third hole along a radial line through said reference point.

16. In a nuclear reactor having a pressure vessel enclosing a core barrel, said pressure vessel having a keyway formed therein, said core barrel having a key adapted to enter said keyway and an attachment pad adapted to mate with said key, an apparatus for aligning said core barrel to said pressure vessel, comprising:

a) a gage having first and second portions, said first portion having a hole formed therein and adapted to enter said keyway, said second portion adapted to mate with said attachment pad; and b) a movable plunger disposed in said hole.

17. The apparatus according to claim 16 further comprising means for moving said plunger coupled to said plunger and disposed in said hole.

18. The apparatus according to claim 17 wherein said plunger moving means comprises means for receiving a voltage, said plunger moving means being responsive to said voltage received.

19. In the nuclear reactor of claim 16 having a pressure vessel enclosing a core barrel, wherein said core barrel encloses a core plate and a plurality of fuel assemblies, said core plate has a notch formed therein, a first pin for each of said fuel assemblies disposed in first holes in said core plate, said core barrel has a second pin adapted to enter said notch disposed in a second hole formed in said core barrel, said apparatus further comprising:

a) a first portion having third holes formed therein, said third holes spaced to correspond with said first holes;

b) a second portion adapted to enter said notch; and c) means, disposed in said second portion, for indicating the location of said notch relative to said third holes in order to align said core barrel to said core plate.

20. The apparatus according to claim 19 wherein said notch location indicating means comprises a movable plunger.

* * * * *